No. 816,081. PATENTED MAR. 27, 1906.
W. M. ELDER & C. W. TURNER.
ANIMAL CHASE.
APPLICATION FILED JULY 15, 1905.
2 SHEETS—SHEET 1.
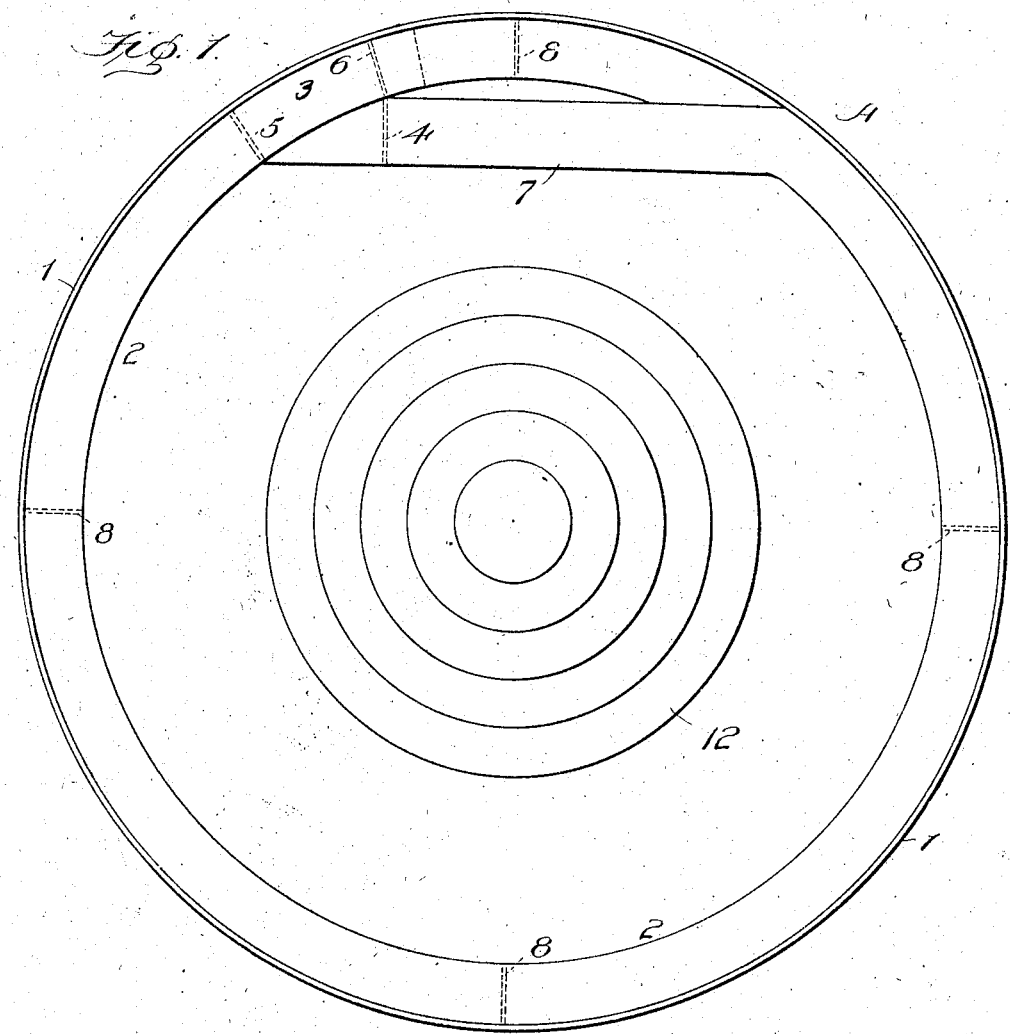
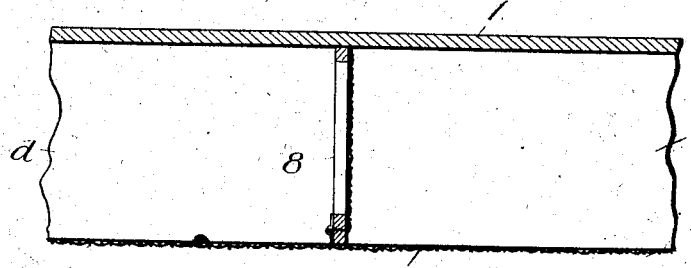
Witnesses
Edwin L. Bradford
Leonard A. White
Inventors
Willis M. Elder
and
Clarence W. Turner
By Ralph Wormelle Attorney

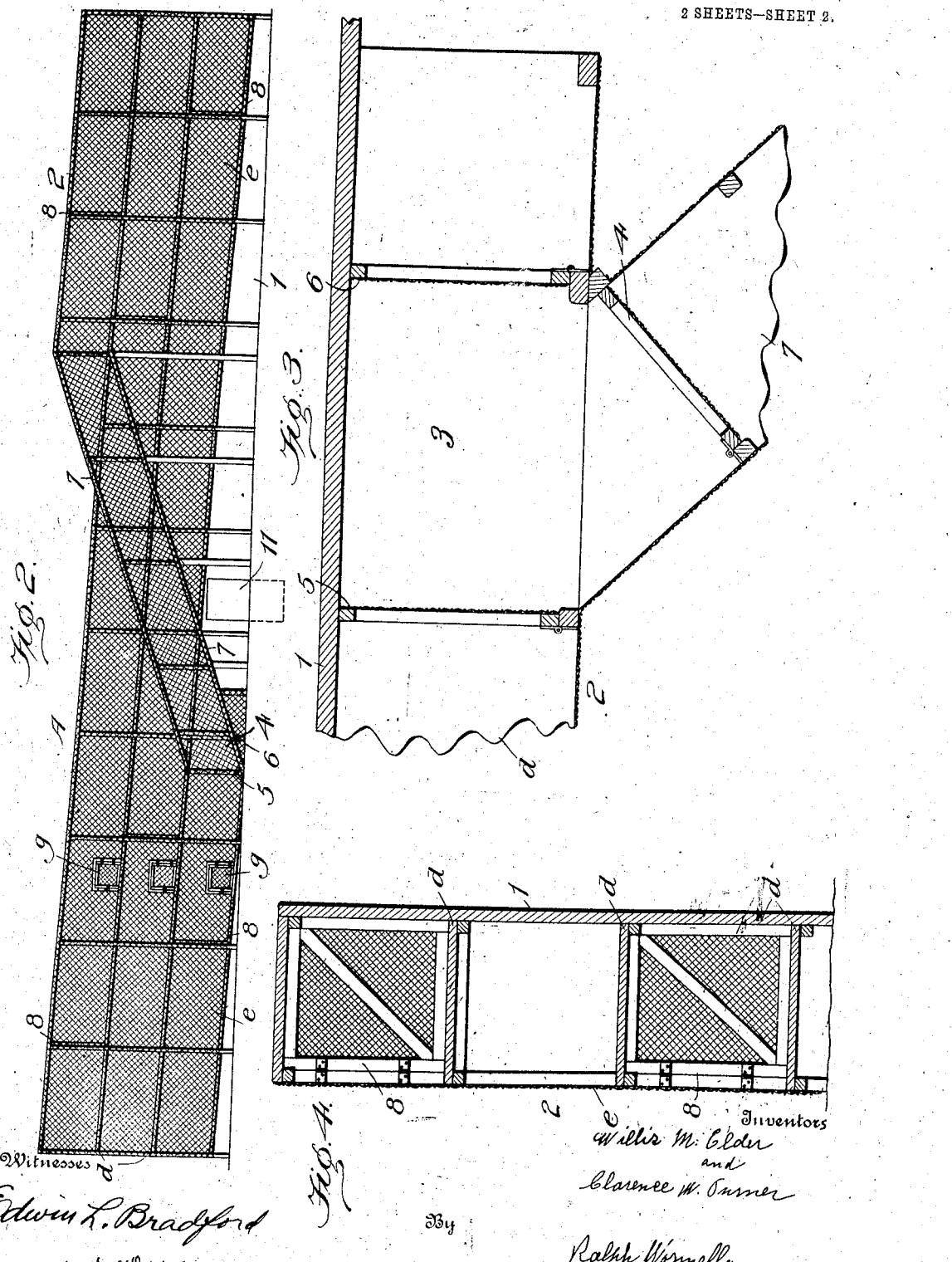

UNITED STATES PATENT OFFICE.

WILLIS M. ELDER AND CLARENCE W. TURNER, OF WAVERLY, TENNESSEE.

ANIMAL-CHASE.

No. 816,081. Specification of Letters Patent. Patented March 27, 1906.

Application filed July 15, 1905. Serial No. 269,821.

*To all whom it may concern:*

Be it known that we, WILLIS M. ELDER and CLARENCE W. TURNER, citizens of the United States, residing at Waverly, in the county of Humphreys and State of Tennessee, have invented new and useful Improvements in Animal-Chases, of which the following is a specification.

Our invention has relation to a certain new and novel structure whereby a fox or other animal chase may be simulated; and it consists, essentially, of a peculiarly-constructed runway in which are arranged certain devices adapted to check or restrain the animals coursing therethrough.

The invention further consists of the general arrangement and combination of the several parts, as will be hereinafter fully described in this specification and briefly stated in the claims.

The prime object of the invention is to provide an amusing and harmless sport for the enjoyment of the public, one in which the element of cruelty to the coursing animals is entirely eliminated.

Other objects of the invention will become apparent upon a further description thereof.

In the drawings, Figure 1 is a top plan view of a structure adapted for our animal-chase; Fig. 2, an inner side elevation showing the arrangement of the runways; Fig. 3, a longitudinal horizontal section of a portion of the runways and the entrance thereto, showing the gates to the entrance-inclosure; Fig. 4, a vertical transverse section of the helical runway; and Fig. 5, a detail of one of the runways, showing one of the checking or restraining gates.

In the several views the letter A indicates a suitable inclosure which may be of any required size and shape, as our animal-chase is designed for the coursing of all classes of animals from the smallest to the greatest.

The numerals 1 and 2 indicate, respectively, the outer and inner walls of the inclosure between which the runway $d$ is arranged. In the present instance the structure is circular in form, and the outer wall is made solid to prevent the coursing exhibition from being witnessed by persons on the outside of the inclosure. The inner wall is composed of a suitable grating or wire-netting $e$, in order that the progress of the chase may be readily observed by those on the inside of the inclosure.

The runway $d$ is constructed in helical form, and its lower and upper terminals are connected together by a covered runway 7, as shown in Fig. 2. Arranged at the lower end of the runway 7 is a gate 4, through which the animals to be coursed may enter from a starting-inclosure 3, formed by the gates 5 and 6. These gates 5 and 6 may be of any desired design and construction and be operated by any suitable means. Arranged in the runway $d$ at proper intervals are checking or restraining gates 8, which may be operated in any well-known manner, whereby the speed of either animal may be checked when desired—as, for instance, when the pursuing animal is in too close proximity to the animal being pursued.

Gates $g$ may be arranged in the inner wall of the inclosure, so as to permit access to the runway $d$ at desired points.

The numeral 11 indicates the public entrance to the inclosure, which is constructed partly below the surface of the ground, as shown by dotted lines in Fig. 2. Situated within the inclosure is a suitable platform or stage 12, from which the coursing of the animals may be witnessed by the admitted public.

In coursing the animals the one to be pursued—say a fox—is let into the inclosure 3 and the gate 4 opened. At about the time gate 4 is opened the pursuing animal—for instance, a dog—is also let into the inclosure 3, and as the gate 4 is left open after the fox has passed through the chase immediately begins, both animals speeding up the runway 7 toward the upper end of the runway $d$. From this point the chase continues in a gradual descent, owing to the helical formation of the runway $d$. When the lower terminal of the runway $d$ is reached by the fox, he is let through the gate 5 into the inclosure 3, and the gate being immediately closed the dog is prevented from following the fox into said inclosure. If desired, the direction of the coursing may be changed to allow the fox to start up the helical runway and finish by way of the inclined runway 7 by opening gate 5 to the fox and then allowing the dog to follow. When the fox reaches the lower end of runway 7, the gate 4 is opened to allow him to enter the inclosure 3 and then closed against the dog.

Having thus described our invention, what we claim as new, and desire to secure by Letters Patent, is—

1. A fox or other animal chase comprising a helical runway, substantially as specified.

2. A fox or other animal chase, comprising a helical runway, the upper and lower ends of which are connected together by a connecting-runway, substantially as set forth and described.

3. A fox or other animal chase, comprising a helical runway the upper and lower ends of which are connected together by a connecting-runway, and means for checking or restraining the pursuit of the coursing animal, substantially as set forth and described.

4. A fox or other animal chase, comprising a helical runway, the upper and lower ends of which are connected together by means of a wire-covered runway, restraining or checking gates situated within said connecting-runway, and checking or restraining gates suitably placed for diverting the direction of the coursing, substantially as set forth and described.

In testimony whereof we affix our signatures in presence of two subscribing witnesses.

WILLIS M. ELDER.
CLARENCE W. TURNER.

Witnesses:
W. A. MEADOW,
MASON SANDERS.